United States Patent [19]

Kouda et al.

[11] Patent Number: 5,061,419
[45] Date of Patent: Oct. 29, 1991

[54] METHOD AND DEVICE FOR MOLDING SKIN-COVERED FOAMED PLASTIC ARTICLE

[75] Inventors: Hiroshi Kouda; Takayuki Saito, both of Kanagawa, Japan

[73] Assignee: Ikeda Bussan Co., Ltd., Ayase, Japan

[21] Appl. No.: 49,556

[22] Filed: May 14, 1987

[30] Foreign Application Priority Data

May 23, 1986 [JP] Japan .................................. 61-77656

[51] Int. Cl.⁵ .............................................. B29C 67/22
[52] U.S. Cl. ................................... 264/46.6; 264/46.4; 249/184
[58] Field of Search .................... 264/45.1, 46.6, 46.7, 264/46.4; 249/184

[56] References Cited

U.S. PATENT DOCUMENTS 3,856,256 12/1974 Celesti .................................. 249/184

FOREIGN PATENT DOCUMENTS

| 54-3189 | 2/1979 | Japan | 264/46.6 |
| 55-158944 | 12/1980 | Japan | 264/46.6 |
| 56-115233 | 9/1981 | Japan | 264/46.6 |
| 60-105505 | 6/1985 | Japan | 264/46.6 |

Primary Examiner—Robert A. Dawson
Assistant Examiner—Allan R. Kuhns
Attorney, Agent, or Firm—Foley & Lardner

[57] ABSTRACT

Disclosed herein is a method and device for molding a skin-covered foamed plastic article with a bore formed therein. A split mold is used which comprises a lower mold part with a recess and an upper mold part with a through bore. The upper mold part is placeable on the lower mold part to form a combined cavity by the through bore and the recess. In order to provide the foamed product with a desirable bore, first and second shaping dies are employed which are combinable with each other to form a combined shaping body which is, upon molding, projected into the combined cavity of the split mold. Upon hardening of the product, the second and first shaping dies are dismantled from the split mold in this order.

7 Claims, 5 Drawing Sheets

METHOD AND DEVICE FOR MOLDING SKIN-COVERED FOAMED PLASTIC ARTICLE

BACKGROUND OF THE INVENTION

1. Field of the Invention

The present invention relates in general to a method and device for molding a foamed plastic article, and more particularly to a method and device for molding a skin-covered foamed plastic article, such as a headrest cushion of an automotive seat.

2. Description of the Prior Art

In molding headrest cushions of an automotive seat, various types of molding methods and devices have been proposed and put into practical use. Some of them are of a type which uses a split mold and a shaping die. The split mold is suitable for molding an article of complicated shape because of its dividable structure. The shaping die is the member that provides the product (viz., headrest cushion) with a bore in which a structural base member is to be received.

In molding, a skin member shaped like a bag is put in the split mold in assembled condition. Then, a liquid material for foamed plastics, such as foamed polyurethane, is poured into the bag in the mold. Then, the shaping die coated with a suitable releasing agent is inserted into the mold and remains therein until the material is adequately cured and hardened. After a certain time, the shaping die is removed from the mold and the mold is divided into parts to remove the bored product from the mold. Because of the dividable structure of the split mold, the removal of the product is easily achieved.

However, due to the inherent constructions thereof, some of the conventional molding devices have encountered severe leakage of the liquid material through clearances inevitably produced in the split mold. This leakage is marked when the foaming reaction of the material becomes severe. This leak sometimes soils the product and thus lowers the quality of the finished product.

SUMMARY OF THE INVENTION

It is therefore an object of the present invention to provide a method and device which are free of the above-mentioned drawback.

According to the present invention, there is provided a method for molding a skin-covered foamed plastic article with a bore formed therein. The method comprises by steps preparing a split mold, the split mold including a lower mold part having a recess and an upper mold part having a through bore, mounting the upper mold part on the lower mold part in such a manner as to form a combined cavity by the through bore and the recess, putting a skin member into the combined cavity in such a manner that the outer surface of the skin member intimately contacts with the wall of the combined cavity, placing a first shaping die on the upper mold part in such a manner that a first projection thereof is projected into the combined cavity lined with the skin member, pouring a liquid material for the foamed plastic article into the combined cavity lined with the skin member, placing a second shaping die on the upper mold part in such a manner that a second projection thereof is projected into the combined cavity lined with the skin member at a position just beside the first projection, removing the second and first shaping dies, in this order, from the split mold upon hardening of the material, and dismantling the upper mold part from the lower mold part thereby facilitating removal of the foamed product from the mold.

According to the present invention, there is further provided a molding device for molding a skin-covered foamed plastic article with a bore formed therein. The molding device comprises a split mold including a lower mold part having a recess and an upper mold part having a through bore, the upper mold part being placeable on the lower mold part in a manner to form a combined cavity by the through bore and the recess, a first shaping die having a first projection, the first shaping die being placeable on the upper mold part having the first projection projected into the combined cavity, the first shaping die having an opening through which the interior of the combined cavity is communicated with the outside of the split mold, and a second shaping die having a second projection, the second shaping die being placeable on the upper mold part having the second projection projected into the combined cavity through the opening of the first shaping die.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Referring to FIGS. 1 to 8, there are shown the steps of molding a skin-covered foamed plastic article "A", viz., headrest cushion (see FIG. 8), by using a molding device 10 of the present invention.

Figure 4:
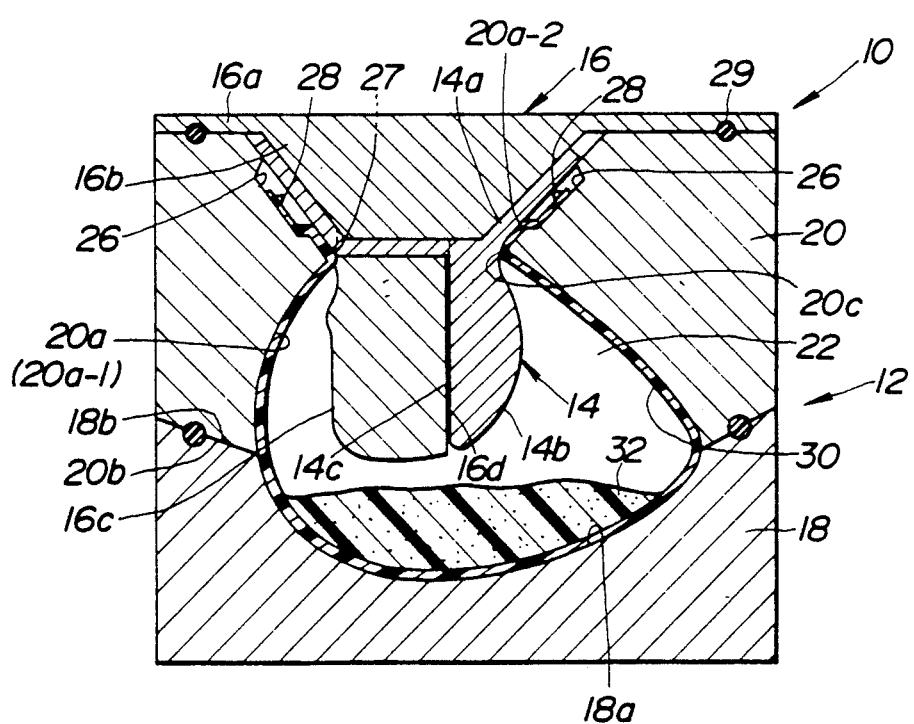
Figure 5:
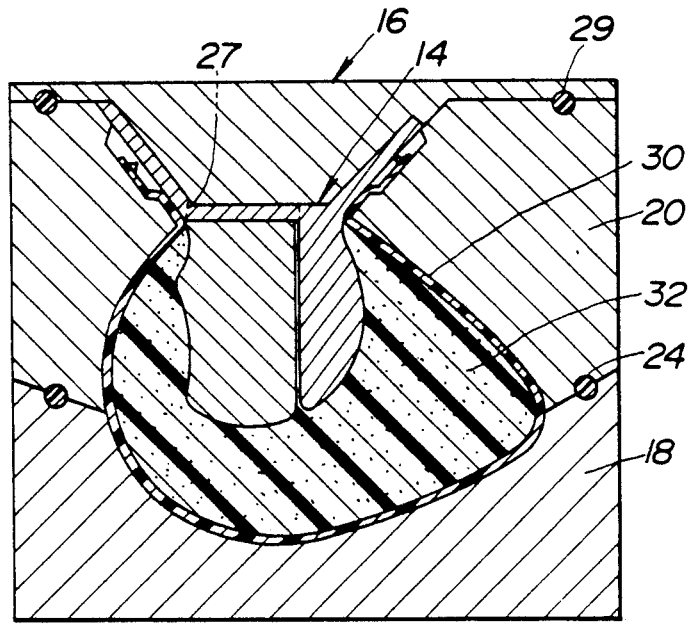

As is best seen from FIG. 4, the molding device 10 comprises generally a split mold 12, a first shaping die 14 and a second shaping die 16, which assume the illustrated positions when a liquid material 32 for foamed plastics is under curing, as will become apparent as the description proceeds.

The split mold 12 comprises a lower mold part 18 having a recess 18a and an upper mold part 20 having a through bore 20a. As is seen from the drawings, when the upper mold part 20 is properly mounted on the lower mold part 18, the bore 20a of the upper mold part 20 aligns with the recess 18a of the lower mold part 18 thereby to constitute a combined cavity 22 which has a contour corresponding to the shape of the product "A". These upper and lower mold parts 20 and 18 are thus formed with intimately contacting surfaces 20b and 18 b which serve as land areas of the split mold 10. As is seen from the drawings, the contacting surfaces 20b and 18b are gradually raised as the distance from the inside edges thereof increases. That is, the upper and lower mold parts 20 and 18 have respectively convex and concave contacting surfaces 20b and 18b. Designated by numeral 24 is a seal ring which is sandwiched between the contacting surfaces 20b and 18b to achieve sealing therebetween. For this purpose, it may be possible that the seal ring 24 is snugly disposed in an endless groove defined by either the contacting surface 18b or the contacting surface 20b. Although not shown in the drawings, a suitable clamping device is employed for holding the upper and lower mold parts 20 and 18 together.

Figure 1:
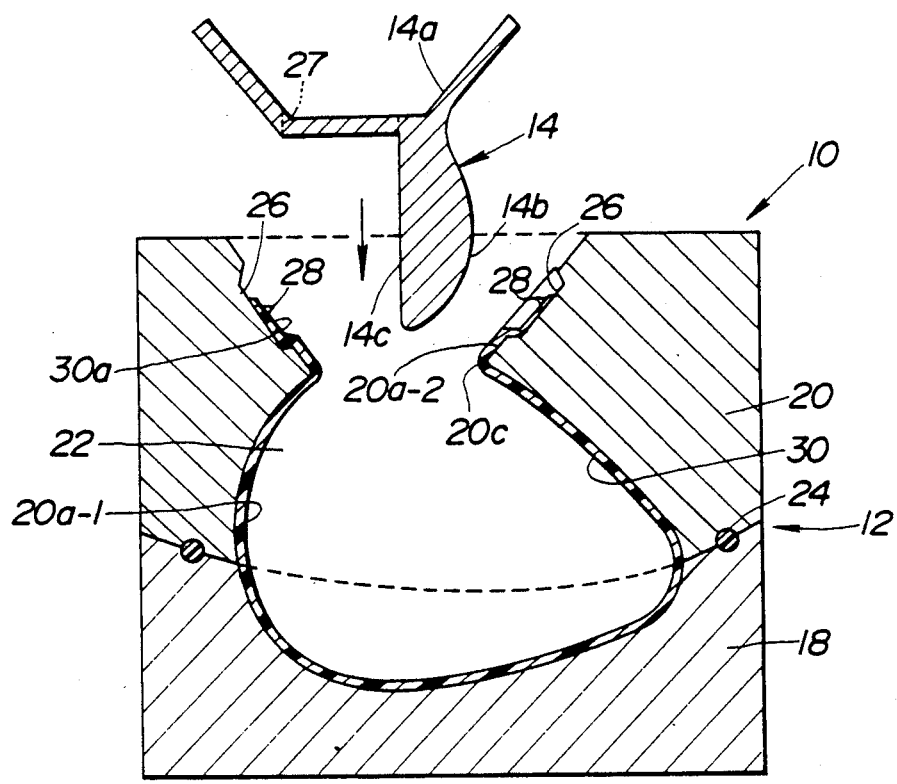
FIGS. 1 to 8 are sectional views of a molding device of the present invention, showing in turns the steps for molding a skin-covered foamed plastic article.
Figure 2:
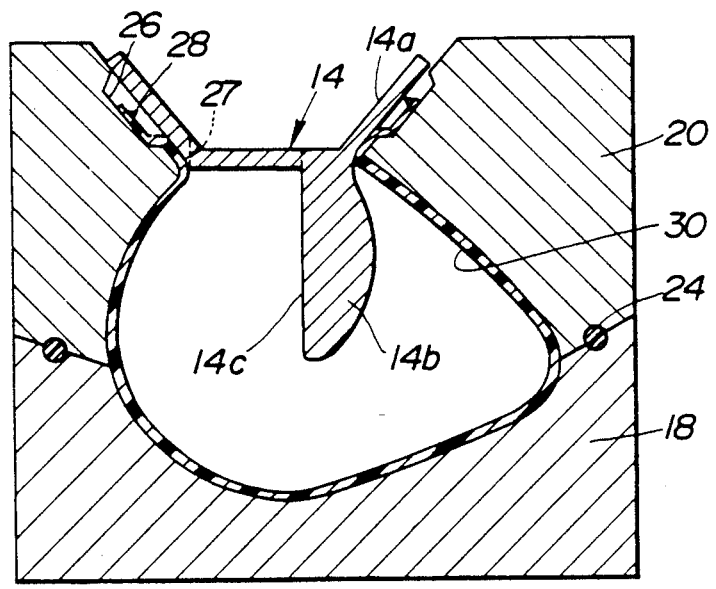
Figure 3:
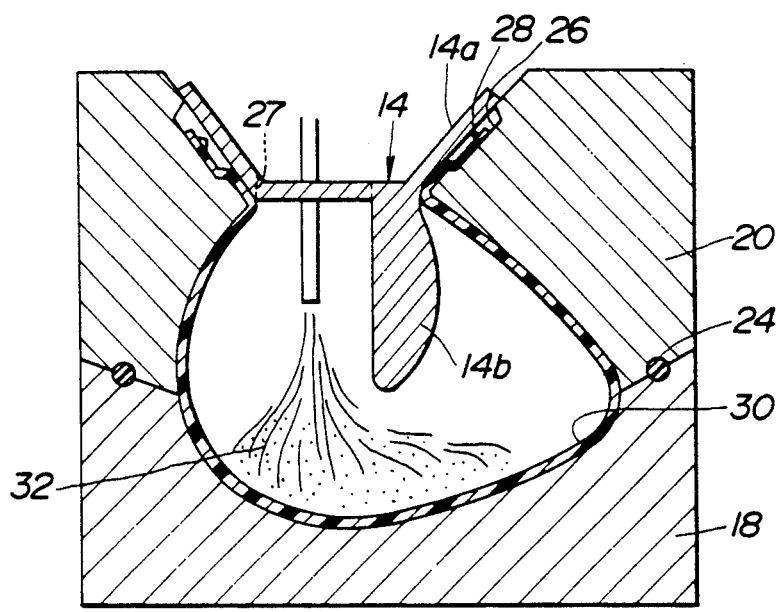

As is clearly understood from FIG. 1, the through bore 20a of the upper mold part 20 comprises a lower bore part 20a-1 and an upper bore part 20a-2 which are bounded by a diametrically reduced throttle portion 20c positioned therebetween. As shown, in the drawings, the upper bore part 20a-2 has an inclined wall which is provided with an annular groove 26. For the purpose which will become apparent hereinafter, a plurality of pointed hooks 28 are provided to the bottom portion of the groove 26, which are arranged at evenly spaced intervals.

As will become apparent as the description proceeds, the first and second shaping dies 14 and 16 are members for providing the foamed plastic product with a bore in which a structural base member of a headrest is to be received.

Referring back to FIG. 4, the first shaping die 14 comprises a bowl-like base portion 14a and a first projection 14b projected downward from one side of the bottom of the base portion 14a. The base portion 14a has a shape corresponding to the contour of the upper bore part 20a-2 of the upper mold part 20. The bottom of the base portion 14a is formed with an opening 27 through which an after-mentioned second projection 16c of the second shaping die 16 is adapted to pass. It is to be noted that the base portion 14a is so sized as to sufficiently cover the groove 26 of the upper mold part 20. The first projection 14b has a flat inside wall 14c.

Figure 6:
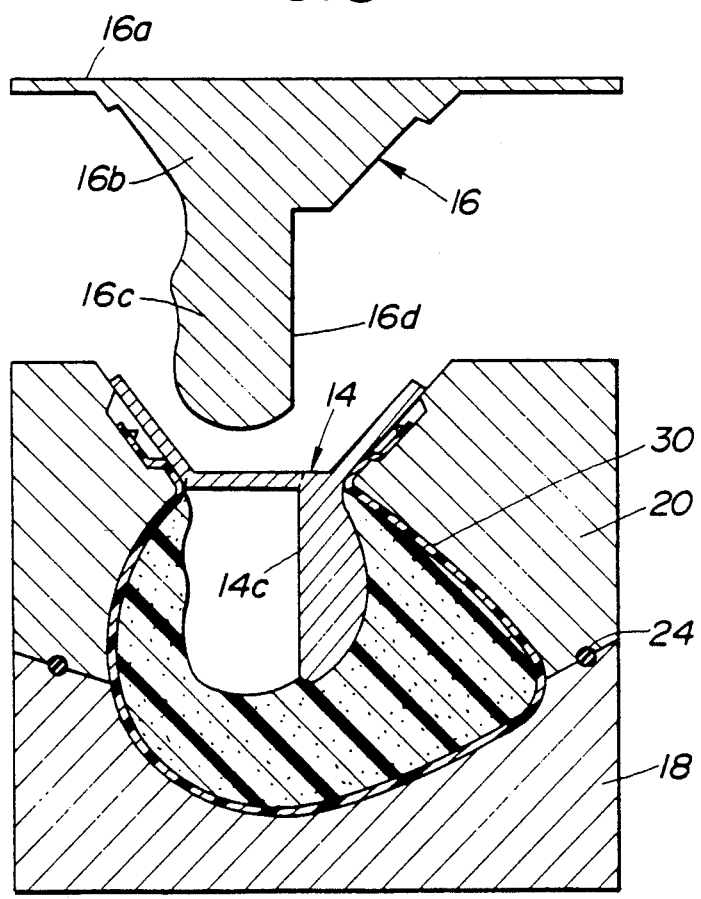
Figure 7:
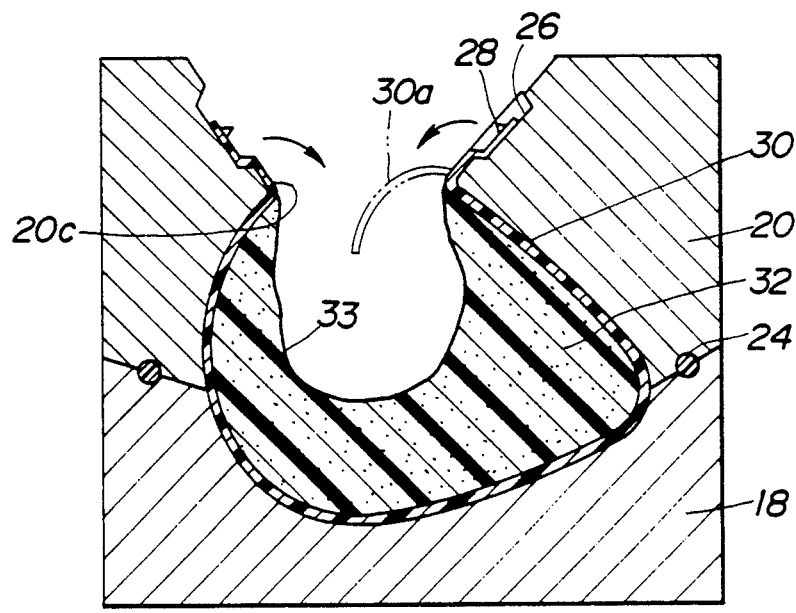
Figure 8:
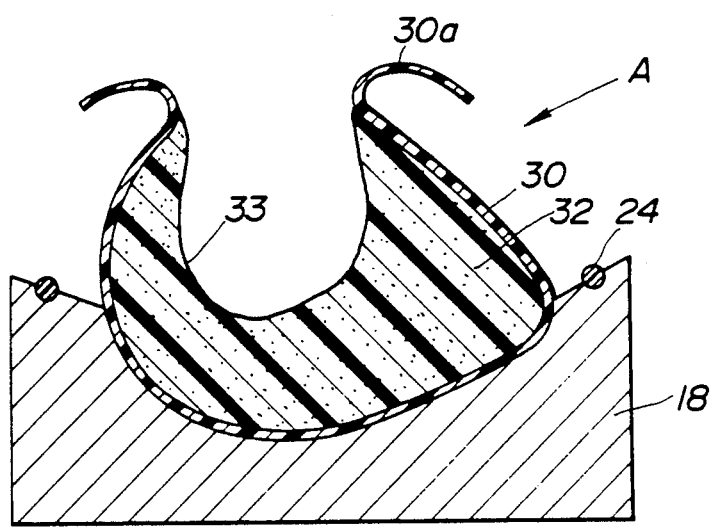

As is seen from FIG. 6, the second shaping die 16 comprises a lid portion 16a which is adapted to be sealingly placed on the upper mold part 20, an intermediate thickset portion 16b which is shaped to be neatly received in the base portion 14a of the first shaping die 14, and a second projection 16c which is projected downward from the intermediate portion 16b. It is to be noted that the second projection 16c is so sized and constructed as to pass through the opening 27 of the bottom of the base portion 14a of the first shaping die 14. The second projection 16d has a flat inside wall 16d. Designated by numeral 29 is a seal ring which is disposed between the lid portion 16a and an upper land of the upper mold part 20 to achieve sealing therebetween.

In the following, the steps of molding the skin-covered foamed plastic article "A" will be described in detail with reference to FIGS. 1 to 8. The article "A" disclosed herein is a headrest cushion of an automotive seat.

As is seen from FIG. 1, first, the upper mold part 20 is properly mounted on the lower mold part 18 and connected tightly to the same by the clamping device (not shown). The split mold 12 thus coupled is then heated to a predetermined temperature. Then, a skin member 30 shaped like a bag is inserted into the combined cavity 22 in such a manner as to intimately contact with the wall of the combined cavity 22. As shown in the drawing, a radially outwardly extending upper flange portion 30a of the bag 30 is caught by the hooks 28 of the upper mold part 20. Then, as is seen from FIGS. 1 and 2, the first shaping die 14 coated with a suitable releasing agent is placed on the upper mold part 20 having the base portion 14a thereof received in the upper bore part 20a-2. When properly set, the base portion 14a of the first shaping die 14 is seated on the inclined wall of the upper bore part 20a-2 and the first projection 14b is vertically projected into the combined cavity 22 lined with the skin member 30. Then, as is seen from FIG. 3, a liquid material 32 for foamed plastics, such as liquid material for foamed polyurethane or the like, is poured into the combined cavity 22 through the opening 27 of the base portion 14a of the first shaping die 14. Then, that is, before vigorous foaming reaction of the material 32 starts, the second shaping die 16 coated with a suitable releasing agent is placed on the upper mold part 20 having the second projection 16c thereof projected through the opening 27 of the base portion 14a of the first shaping die 14 into the combined cavity 22. As is seen from FIG. 4, under this condition, the intermediate thickset portion 16b of the second shaping die 16 is neatly received in the bowl-like base portion 14a of the first shaping die 14. As is seen from the drawing, upon proper positioning of the first and second shaping dies 14 and 16, the flat inside walls 14c and 16d of the first and second projections 14b and 16c neatly mate with each other. Thus, thereafter, the foaming reaction, that is, curing of the material 32 is carried out in the combined cavity 22 with an aid of heat possessed by the split mold 12, as is understood from FIG. 5.

After a given time during which the material 32 has cured and hardened sufficiently, the second shaping die 16 is removed from the mold 12, and then, the first shaping die 14 is removed from the same. With this, there is produced a foamed plastic article "A" having a bore 33 formed therein, as is seen from FIG. 7. Then, the upper flange portion 30a of the bag-shaped skin member 30 is unfastened from the hooks 28 and then, the upper mold part 20 is dismantled from the lower mold part 18, as is seen from FIG. 8, thereby to facilitate removing of the product "A" from the lower mold part 18.

Figure 9:
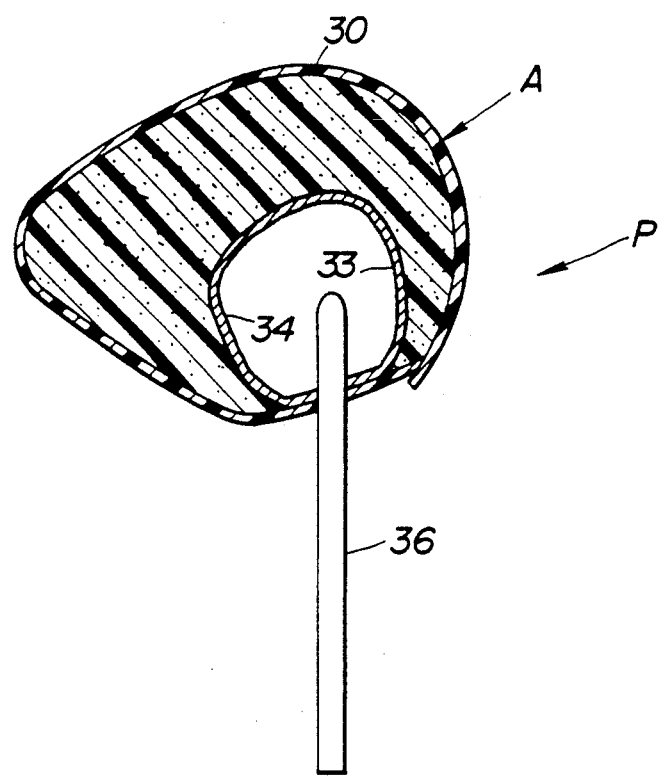
FIG. 9 is a sectional view of a finished headrest which comprises a headrest cushion produced by the molding device of the present invention.

Referring to FIG. 9, there is shown a finished product "P" of the headrest, which comprises the article "A", a structural bore member 34 received in the bore 33 of the article "A" and two stays 36 fixed to the structural core member 34.

In the following, advantages of the present invention will be listed.

(1) Because two shaping dies 14 and 16 are employed for providing the foamed product "A" with the bore 33, setting the dies to the mold 12 is tightly achieved without producing marked clearances among the contact surfaces of these two dies and the mold. Thus, undesirable leakage of the liquid material from the mold cavity is prevented or at least minimized.

(2) Because of usage of two shaping dies 14 and 16 which are combinable, various types of bores can be produced in the foamed product "A" without caring about dismantling of the dies 14 and 16 from the mold 12. In fact, as has been described hereinabove, dismantling of the shaping dies 14 and 16 is easily achieved.

(3) Because the upper flange portion of the skin member 30 is fastened to the upper mold part 20 by the hooks 28, the skin member 30 remains stationary in the cavity 22 even when the foaming reaction of the material 32 is vigorously carried out.

What is claimed is:

1. A method for molding a skin-covered foamed plastic article with a bore formed therein, comprising by steps;
 (a) preparing a split mold, said split mold including a lower mold part having a recess and an upper mold part having a through bore;

(b) mounting said upper mold part on the lower mold part in such a manner as to form a combined cavity by said through bore and said recess;

(c) putting a skin member into said combined cavity in such a manner that the outer surface of the skin member intimately contacts with the wall of the combined cavity;

(d) placing a first shaping die on said upper mold part in such a manner that a fist projection thereof is projected into the combined cavity lined with the skin member;

(e) pouring a liquid material for the foamed plastic article into the combined cavity;

(f) placing a second shaping die on the upper mold part in such a manner that a second projection thereof is projected into the combined cavity at a position just beside the first projection;

(g) removing the second and first shaping dies, in this order, form the split mold upon hardening of the material; and (h) dismantling the upper mold part from the lower mold part thereby to easily remove the foamed product from the mold;

wherein step (d) is carried out before step (e) and step (e) is carried out before step (f).

2. A method as claimed in claim 1, in which before the step (d), a given portion of the skin member is fastened to said upper mold part, and in which before the step (h), the given portion of the skin member is unfastened from the upper mold part.

3. A method as claimed in claim 1, in which said second shaping die is guided by said first shaping die in step (f).

4. A method as claimed in claim 1, in which said step (f) is carried out just after the step (e).

5. A method as claimed in claim 1, in which before the step (d), said first shaping die is coated with a releasing agent and in which before the step (f), said second shaping die is coated with a releasing agent.

6. A method as claimed in claim 1, consisting essentially of the recited steps.

7. A method as claimed in claim 4, consisting essentially of the recited steps.

* * * * *